United States Patent [19]

Stachowiak

[11] Patent Number: 4,485,527
[45] Date of Patent: Dec. 4, 1984

[54] FILLETING BOARD

[75] Inventor: Weis A. Stachowiak, Lunenburg, Canada

[73] Assignee: Fisheries Resource Development Limited, Dartmouth, Canada

[21] Appl. No.: 491,816

[22] Filed: May 5, 1983

[30] Foreign Application Priority Data

Nov. 1, 1982 [CA] Canada ................................. 416600

[51] Int. Cl.$^3$ ..................... A22C 17/02; A22C 25/00
[52] U.S. Cl. ......................................... 17/70; 269/303
[58] Field of Search .............................. 17/70, 56, 44; 269/289 R, 303

[56] References Cited

U.S. PATENT DOCUMENTS

| 1,771,294 | 7/1930 | Hackett ........................... 269/289 X |
| 2,825,928 | 3/1958 | Thornton . |
| 3,015,841 | 1/1962 | Reutz ..................................... 17/70 |
| 3,052,914 | 9/1962 | Luedtke . |
| 3,165,779 | 1/1965 | Teetor et al. ........................... 17/70 |
| 3,878,586 | 4/1975 | Hoppert et al. ........................ 17/70 |
| 4,030,164 | 6/1977 | Fick ....................................... 17/70 |
| 4,205,832 | 6/1980 | Kuzio ................................. 17/70 X |

FOREIGN PATENT DOCUMENTS

| 75526 | 3/1902 | Canada . |
| 105949 | 4/1907 | Canada . |
| 742510 | 9/1966 | Canada . |

OTHER PUBLICATIONS

P. J. Amaria et al.—Productivity Studies in Fish Processing-Proposed New Method of Manual Filleting of Cod-Paper Presentation—Atlantic Fisheries Technological Conference, Williamsburg 1978.

Primary Examiner—Willie G. Abercrombie
Attorney, Agent, or Firm—Stevens, Davis, Miller & Mosher

[57] ABSTRACT

The invention provides an improved fish filleting board including an elongated body having a major top surface. A recess in the top surface defines a floor providing a minor support surface disposed below said major top surface (in the operational position of the board). This minor support surface is arranged to receive and support the head of a fish in approximate alignment with the spine of the fish after removal of the first fillet therefrom while at the same time the cut portion of the fish body lies flat on the major top surface with the spine thereof lying parallel to it. An abrupt step is defined between a portion of the top surface and the floor of the recess and against which the cut portion of the fish head may be lodged to stabilize the fish during removal of the second fillet. The support and stability afforded by the above recited structures enable filleting techniques to be used which result in a considerably higher yield insofar as the second fillet is concerned.

19 Claims, 13 Drawing Figures

FILLETING BOARD

BACKGROUND OF THE INVENTION

This invention relates to improved apparatus for the filleting of fish.

The traditional methods and facilities used for hand filleting of the more common species of fish such as codfish, have not varied significantly over the past many years. The usual procedure involves removing a fish from a fish box and placing it flat on a cutting table. Then, by using one or a series of knife cuts, depending on the size and type of fish as well as the technique preferred by the individual operator, a fillet is removed from the first side of the fish. The fillet is placed in a container and then the fish is rotated 180°, flipped over and a fillet is removed from the second side. The second fillet is placed in the container and the frame (head and backbone) of the fish is then discarded via a chute located to one end of the table.

The above-described procedure can be carried out fairly rapidly by an experienced operator, and in order to provide an incentive to the operator, most fish plants pay a bonus, which bonus is dependent on the operators' total productivity in terms of the weight of fish filleted per shift. Productivity however is not the only factor in an efficient processing operation. The "yield", which is a measure of the weight of fillets removed as compared with the overall weight of the fish, is also of great importance. A careless or unskilled operator may waste a great deal of edible flesh, i.e. more flesh than necessary may be left on the frame. For this reason fish plants traditionally pay close attention to the average yield as well as the total production of each operator.

It has been known for some time that the vast majority of operators obtain a higher yield on the first fillet removed from the frame as compared with the second fillet. Studies have shown that there are two main reasons for this. When filleting the second side of the fish, the first fillet has already been removed from the frame resulting in:

(a) relatively little clearance between the cutting surface and the cutting table making it difficult to pass the filleting knife parallel to the fish backbone;

(b) a gap between the cutting table surface and the fish frame in the area adjacent to the head. Therefore, the fish bows downwardly under the pressure of the cutting knife since there is no firm support underneath the fish frame.

Although the prior art has provided a number of devices for holding or supporting fish during a cleaning or filleting operation, none of them deal adequately with the basic problem created by the bowing downwardly of the fish and the curving of its spine after the first fillet has been removed and the fish has been turned over. U.S. Pat. No. 4,030,164 issued June 21, 1977 to Fick shows a filleting board having a curvate opening in its surface arranged so that the gill cover of the fish enters into it thereby to assist in retaining the fish in position. Most commercially utilized species of fish have gill covers streamlined with the head; hence guiding the gill cover into the opening would require a special time consuming effort which would result in productivity loss. From an operational point of view, the filleting of fish on Fick's device would require the operator to remove one fillet from the backside of the fish and the other fillet from the abdomen side, unless the operator would cut one fillet and then proceed to the opposite side of the board to remove the second fillet facing the backside of the fish. Needless to say, filleting from the back and abdomen side would result in poor yield and the necessary additional movement of the operator would take extra time and room. There is also no suggestion in the above patent of any means to support the cut side of the fish as well as the fish head so that the latter is retained as a straight extension of the spine of the fish during removal of the second fillet. The bowing problem referred to above is not dealt with by the Fick patent.

Studies have also been carried out by others on this problem especially by P. J. Amaria et al and reported in a paper entitled "Productivity Studies In Fish Processing"—Proposed New Method of Manual Filleting of Cod (presented at the Atlantic Fisheries Technological Conference, Williamsberg, Va. 1978). In that paper, a filleting board design is described, which design includes a large notch at one end of the board to receive the fish head during removal of the second fillet. The board surface was also sloped away from the operator at about an 8° angle to make it easier for the operator to run the knife parallel to the cutting board surface. While the sloped board surface has been found to be advantageous, the particular notched board design described by Amaria et al has been found, as a result of subsequent tests, to have numerous disadvantages. There is an empty space below the notch and hence the fish head tended to droop downwardly into it in many cases thus causing the spine of the fish to arch upwardly. In other cases large fish heads would not properly enter into the notch. As a result the fish head was not supported in general alignment with the backbone. Furthermore the notch described by Amaria did not properly capture the gill or the cut portion of the head with the result being that the head tended to jump out of the notch when pressure was applied to the fish during fillet removal.

SUMMARY OF THE INVENTION

It is a general object of the present invention to provide an improved filleting board which alleviates the problems described above and which provides for improved yield without sacrificing productivity.

Thus, the invention in one aspect, provides a fish filleting board including an elongated body having a major top surface. A recess in the top surface defines a floor providing a minor support surface disposed below said major top surface (in the operational position of the board). This minor support surface is arranged to receive and support the head of a fish in approximate alignment with the spine of the fish after removal of the first fillet therefrom while at the same time the cut portion of the fish body lies flat on the major top surface with the spine thereof lying parallel to it. An abrupt step is defined between a portion of the top surface and the floor of the recess and against which the cut portion of the fish head may be lodged to stabilize the fish during removal of the second fillet. The support and stability afforded by the above recited structures enable filleting techniques to be used which result in a considerably higher yield insofar as the second fillet is concerned.

The above-noted step preferably includes a wall portion which is undercut so that such wall portion is at an acute angle with respect to said major top surface. In use, the cut portion of the fish head, which follows closely adjacent to the gill opening, can be engaged firmly with said step as the fish head is pushed against said wall portion.

The above-noted recess preferably extends from one of the ends of the board toward an intermediate portion of the body. The frame of the fish is moved along such recess and away from the end of the board after the second fillet has been removed.

The above-noted step preferably extends in a smoothly curved path from one of the ends of the body toward the intermediate portion, and there curves smoothly around as seen in top plan view and proceeds in the opposite direction for a selected distance. The undercut wall portion is preferably located in the intermediate portion of the body where the path curves smoothly around and begins to proceed in the opposite direction.

As a further feature, the floor of the recess has a shallow concavity defined therein closely adjacent said undercut wall portion, which concavity slopes shallowly downwardly generally toward said undercut wall portion thereby to assist in providing support for a range of sizes of fish heads.

In a typical form of the invention the major top surface is essentially flat and the board is arranged so that, in its operational position, the flat major surface of the board slopes downwardly from the horizontal by an angle of 4 to about 12 degrees in a direction transverse to the longitudinal axis of the board. Suitable means are provided for supplying a flow of water transversely of the board to flush slime and scales off the board surface. The board body is preferably of a unitary synthetic plastics material for purposes of ease of fabrication, cleanliness etc.

BRIEF DESCRIPTION OF THE VIEWS OF DRAWINGS

An embodiment of the invention will now be described with reference to the drawings wherein.

DETAILED DESCRIPTION OF THE PREFERRED EMBODIMENT

Figure 1:
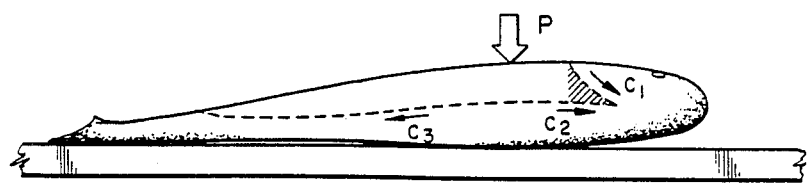
FIGS. 1 and 2 illustrate prior art filleting techniques.
Figure 2:
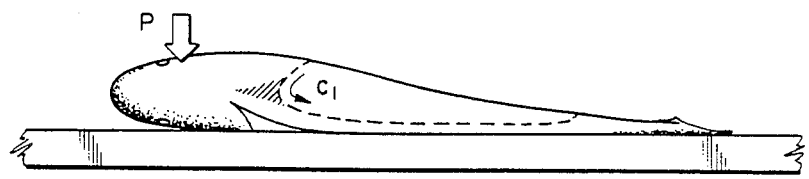
Figure 3:
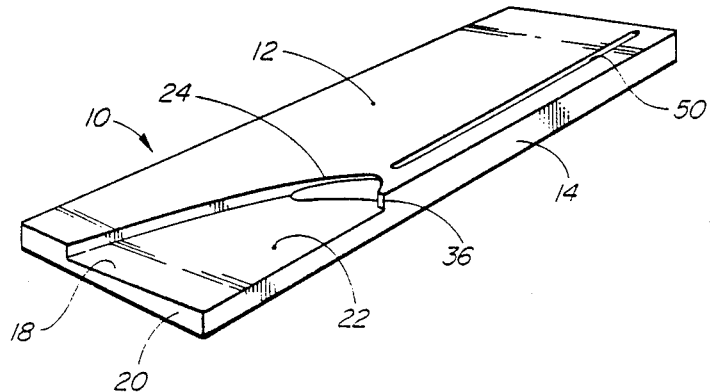
FIG. 3 is a perspective view of the filleting board in accordance with the invention.

With reference to FIGS. 1 and 2, conventional filleting techniques are depicted. The precise sequence of knife cuts need not be described since the sequence will depend on both the operator and the size and species of fish. It suffices to say that, in general, in the course of removing the first fillet, the fish is laid on the cutting board surface as in FIG. 1, stabilized by downward hand pressure P, while a series of knife cuts are made including two knife cuts into the head region, which cuts are designated by the references C1 and C2. The filleting knife is also made to move along the spine of the fish (cut C3) to separate the first fillet. By virtue of the two cuts C1 and C2 in the head region of the fish, an experienced operator can remove substantially all of the marketable flesh from the triangular region illustrated by the shading immediately behind the head of the fish thus contributing to a high yield. The situation regarding the second fillet removal is somewhat different. The operator turns the fish over so that it rests on the head and cut side, rotates it end for end and applies hand pressure P to stabilize it. A single knife cut C1 is then made, the cut line beginning at the surface just rearwardly of the gill cover and entering inwardly and forwardly and thence curving gradually around and extending rearwardly in close parallelism to the spine of the fish. After the removal of the second fillet, the frame of the fish is discarded together with the marketable flesh remaining on it. The technique described above gives rise to a lower yield for the second fillet because the flesh in the shaded triangular region behind the head is not removed with the fillet but instead is discarded with the frame. The cutting technique giving rise to this wastage is necessitated by the fact that the spine of the fish is not properly supported along its length and bows downwardly, especially in the region near to the head under the pressure applied by the operator. It has been found, under these conditions, to be impractical in terms of productivity and safety requirements to use two cuts into the head region in an effort to remove all the edible flesh. The net result is that the average yield for the second fillet is usually well over 1% less than the yield for the first fillet. When considering the large tonnages of fish processed annually, the yield loss is quite significant.

Figure 9:
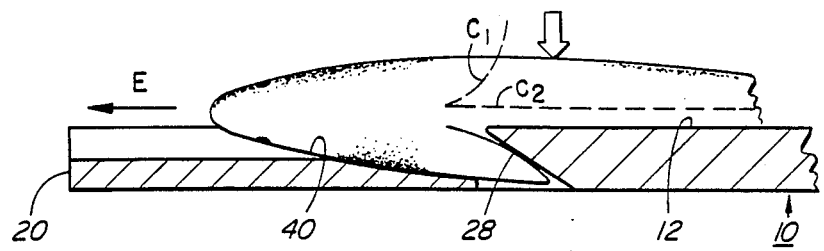
FIG. 9 is a diagrammatic section view of the board illustrating the manner in which the fish is engaged with the board during the removal of the second fillet.
Figure 8:
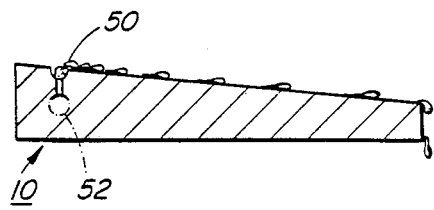
FIG. 8 is a section view taken along line 8—8 of FIG. 4.
Figure 10:
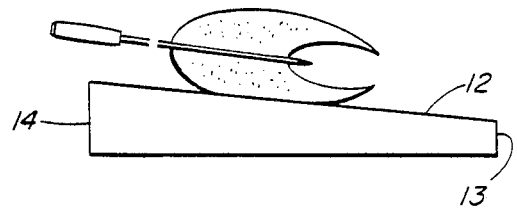
FIGS. 10 and 11 are cross-section views illustrating the relationship of the knife to the board surface during removal of the first and second fillets.
Figure 11:
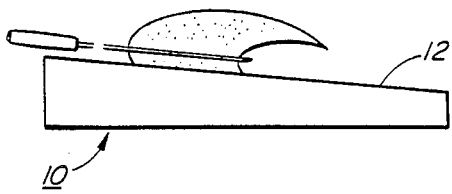

A preferred form of filleting board for alleviating the above problem is shown in FIGS. 3-8 and the method for using same is illustrated in FIGS. 9-11.

As illustrated, the filleting board 10 is defined by an elongated rectangular body having a major top surface 12 which is essentially flat. Top surface 12 is sloped relative to the base of the board by a suitable angle from 4 to 12 degrees, preferably from 5 to 8 degrees, for reasons to be discussed hereafter. The top surface 12 may be provided with shallow "pebbles" which serve to frictionally grip a fish placed on it, without, at the same time, providing crevices which would tend to hold dirt and bacteria. The longitudinal sides 13 and 14 of the board may be provided with shallow notches 16 (FIG. 4) which engage with fittings (not shown) located on a standard filleting table thereby to prevent the board from sliding relative to such table during use. The boards will normally be supplied in a standard width, but in a series of overall lengths thereby to render the boards useable with a variety of lengths of cutting tables. The board may be made (such as by moulding) from any one of several plastic materials, such as high density polyethylene for ease of manufacture, durability, sanitary purposes etc.

Figure 4:
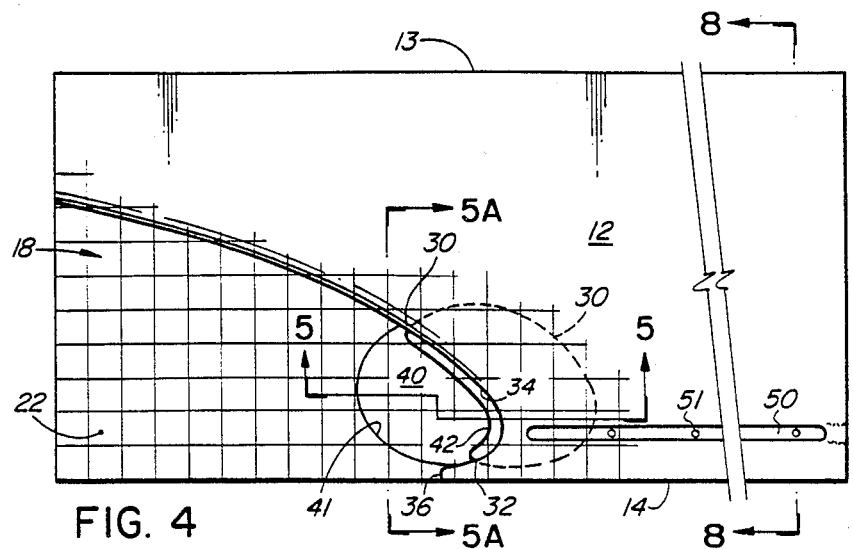
FIG. 4 is a top plan view of the filleting board.
Figures 5, 5A:
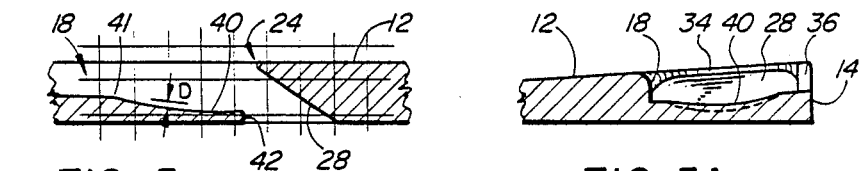
FIG. 5 is a section view taken along line 5—5 of FIG. 4.
FIG. 5A is a modified section view along line 5A—5A and looking in the direction of the arrows.
Figure 5B:
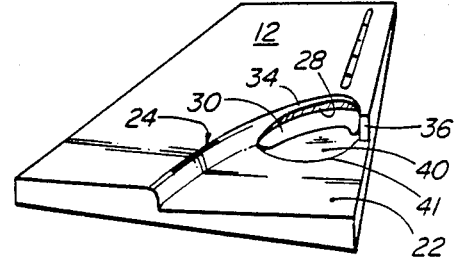
FIG. 5B is a pictorial view looking into the recess in the board from a point above the board.
Figures 6, 7:
FIG. 6 is an elevation view of one end of the board.
FIG. 7 is an elevation view of the opposite end of the board.

Particular reference will now be had to FIGS. 4-7. FIGS. 4 and 5 are shown as being laid out on a 1 inch (2.54 cm) square grid thereby to better illustrate the size and proportions of the various elements of this embodiment of the invention. The board and particularly the features of the head holding recess are most applicable to groundfish species such as cod, haddock, pollock, cusk, hake and some flat fish species such as small halibut 2-6 kg and larger turbot. Other flat fish species, i.e. flounder, greysole, lemonsole, etc. having a relatively small and thin head would not usually benefit from the head holding recess feature of the board; however, the sloping top surface of the board (12) enables the operator to insert the knife and run it at the correct angle with considerably reduced effort in comparison to the same operation performed on a flat board resulting in higher average filleting yield. This feature will be described in further detail hereafter. The invention, however, is not to be limited to the example shown but is to extend to all reasonable modifications and variations thereof as hereafter defined.

A relatively large recess 18 is provided in the top surface of the board, such recess extending inwardly from one end 20 of the board to an intermediate portion of same. The recess 18 includes a floor portion 22 defining a minor support surface which is disposed below the major top surface 12 in the normal operational position of the board. An abrupt step 24 is defined between a portion of top surface 12 and the floor 22 of the recess and against a part of which the cut portion of the fish head may be lodged to stabilize the fish during removal of the second fillet.

The step 24 includes a wall 26, a portion 28 of which is undercut so that it is at an acute angle relative to the major top surface 12. The outline of the undercut portion 28 is shown by the dashed line 30 in FIG. 4. In the embodiment shown, this acute angle is about 30° in the region of section line 5—5 in which region the lip 34 defining the extreme terminal edge of the step is relatively thin, (e.g. 1/16 inch radius). This lip remains relatively thin in both directions away from section line 5—5 as seen in FIG. 5A with the lip thickness rapidly increasing adjacent points 32, at which points the undercut portion of the step terminates. The step 24, again as best seen in FIG. 4, extends in a smoothly curved path from end 18 toward the intermediate region of the board and thence curves smoothly around and begins to proceed back toward end 18 for a short distance before terminating at 36. The above-noted undercut portion 28 of the step is located in this intermediate portion of the body where the path curves smoothly around and begins to proceed in the opposite direction.

The above-noted floor 22 of the recess includes a shallowly concavely contoured floor portion 40 which serves to support the fish head during second fillet removal. Floor portion 40 slopes shallowly downwardly toward the undercut portion of the step 24 as best seen in section in FIG. 5. Floor portion 40 has a free forward edge 42, the contour of which, in plan, parallels that of the lip 34 as clearly seen in FIG. 4. A substantial gap or opening is defined between edge 42 and the undercut wall portion 28. The provision of this gap, in addition to accommodating a portion of the fish head as hereafter described, allows debris from the cutting operation and fluids to drain away from the board. The gap also facilitates the manufacturing operations used to produce the board.

The rear margin of the floor portion 40 is defined by line 41 (FIGS. 4 and 5). In the embodiment shown, both the degree of slope of floor portion 40 and the maximum depth of the concavity are relatively small, the maximum depth D being about ⅛ inch and the average slope being in the order of 8° relative to the base of the board.

The basic function of the floor portion 40 is to support the fish head approximately in alignment with the spine when the cut side of the fish is lying on the major top surface 12 during removal of the second fillet. The configuration described is capable of accommodating a wide variety of sizes of fish head while still supporting same in such a way that the cut side of the fish is fully supported along its length with the spine parallel to the board top surface. The shallowly concave floor portion 40 of the board slopes downward as noted above and enables the board to accommodate the head of a fairly large fish. Consequently, when a large fish is being filleted, and the gill cover is inserted into the slot, because of the size of the fish's head and the slope of the floor portion 40 the tip of the fish's nose points slightly upward and extends outward beyond the rear margin 41 of the floor portion 40. However, the flesh laden posterior to the head part of the fish will almost be a straight line extension of the spine—a filleting condition most desirable for extracting maximum fish flesh in a fillet form derived from the head area. In the case of small fish, the tip of the nose will drop slightly downward from the level of the major top surface and will find support on floor portion 40 and again that flesh laden posterior to the head part of the fish will be almost a straight line extension of the spine similar to the situation encountered in the filleting of large fish as described above. In both cases, i.e. relatively large fish where the nose points slightly upwardly, and relatively small fish where the nose points slightly downwardly, it can still be said that the fish head is approximately in alignment with the spine when the cut side of the fish is lying flat on the major top surface 12. The undercut wall portion 28 coupled with the relatively large gap between wall portion 28 and edge 42 permits the cut portion of the fish head to be engaged firmly in a wedge-like fashion with the step 24 as the head is pushed against the step during the filleting procedure. The head is held firmly in place and does not tend to jump out of position due to the wedging action provided.

It was noted previously that the major top surface of the board is sloped relative to the base surface of the board. Board side 14 is the "high" side of the board, this being the side from which the operator works, the slope assisting in allowing the operator to run his knife parallel to the board top surface and to the spine of the fish during removal of the first and second fillets (see FIGS. 10 and 11). The sloping top surface also facilitates the continuous cleaning of the board and for this purpose a washing groove 50 is provided in such surface, this groove extending parallel to the "high" side 14 of the board from closely adjacent step 24 to a point close to the second end 20. The groove 50 is in communication via spaced holes 51 on elongated bore 52 in the board to which a nipple (not shown) may be connected to supply water under pressure to the groove. In use, the water flows steadily from the groove, flushing away scales and slime.

The manner in which the cutting board is used will be readily apparent from the above and from FIGS. 9-11. FIG. 10 shows the first fillet being removed using generally conventional techniques with the fish lying on the major top surface of the board. After removal of the first fillet, the fish is turned end for end and flipped over on its cut side. The head is located in the recess 18 (FIG. 9) and supported on the sloped concavely contoured floor portion 40 in approximate alignment with the spine of the fish, the spine lying on and extending parallel to the major top surface 12. The cut portion of the head is wedged into the undercut portion 28 of the step 24. Then, stabilizing the fish with hand pressure P, the second fillet is removed using, as part of the cutting sequence, two cuts into the head region along cut lines C1 and C2 thereby enabling the triangular region of flesh (which was previously wasted) to be removed as a part of the second fillet. After completion of the cutting sequence, the frame of the fish is slid along the floor of recess 18 in the direction of arrow E outwardly and away from end 20 of the board and into a refuse chute (not shown).

It has been found in the course of several trial production runs that the use of the filleting board has resulted in a significant increase in yield (often exceeding 1%) without, after an initial operator training period, adversely affecting productivity. Indeed, after a period of time, many operators found that by using the board they suffered considerably less fatigue and were thus able to increase their productivity without adverse effects. Fish plant operators will benefit from the increased yield and the potential increase in productivity and at the same time will appreciate the relatively low initial cost of the board, the ease with which it can be cleaned and the fact that its installation does not require significant modification of existing in-plant facilities.

I claim:

1. A fish filleting board including an elongated body having a major top surface, a recess in said top surface defining a floor providing a minor support surface disposed below said major top surface in the operational position of the board and arranged to receive and support the head of a fish in approximate alignment with the spine of the fish after removal of the first fillet therefrom such that the cut portion of the fish body can lie directly on said major top surface with the spine thereof lying parallel to said major top surface, an abrupt step being defined between a portion of said major top surface and the floor of said recess and against which step the cut portion of the fish head may be lodged to stabilize the fish during removal of the second fillet.

2. A filleting board according to claim 1 wherein said step includes a wall portion which is undercut so that such wall portion is at an acute angle with respect to said major top surface so that the cut portion of the fish head, which follows the gill opening, can engage firmly with said step as the fish head is pushed against said wall portion.

3. The filleting board of claim 2 wherein said elongaged body includes opposing ends with said recess extending from one of said ends toward an intermediate portion of the body.

4. The filleting board of claim 3 wherein said step extends in a smoothly curved path from said one of the ends of the body toward said intermediate portion, and there curving smoothly around as seen in top plan view and proceeding in the opposite direction generally toward said one end for a selected distance.

5. The filleting board of claim 4 wherein said undercut wall portion is located in said intermediate portion of the body where said curved path curves smoothly around and begins to proceed in the opposite direction.

6. The filleting board of claim 2 wherein the floor of said recess has a shallow concavity defined therein closely adjacent said undercut wall portion, which concavity slopes shallowly downwardly generally toward said undercut wall portion thereby to assist in providing support for a range of sizes of fish heads.

7. The filleting board of claim 1 wherein said major top surface is essentially flat.

8. The filleting board of claim 2 wherein said major top surface is essentially flat.

9. The filleting board of claim 1 wherein said board is arranged so that, in its operational position, the top surface of the board slopes downwardly from the horizontal by an angle of 4 to about 12 degrees in a direction transverse to the longitudinal axis of the board.

10. The filleting board of claim 2 wherein said board is arranged so that, in its operational position, the top surface of the board slopes downwardly from the horizontal by an angle of 4 to about 12 degrees in a direction transverse to the longitudinal axis of the board and means for supplying a flow of water transversely of the board to flush slime and scales off the board surface.

11. The filleting board of claim 1 wherein said board body is of a unitary synthetic plastics material.

12. A fish filleting board including an elongated body having a major top surface, a recess in said top surface defining a floor providing a minor support surface disposed below said major top surface in the operational position of the board and arranged to receive and support the head of a fish, from which the first fillet has been removed, in such a manner that the cut side of the fish body lies directly on and is fully supported along its length by said major top surface with the spine thereof lying parallel to said major top surface, an abrupt step being defined between a portion of said major top surface and the floor of said recess, said step including a wall portion which is undercut so that such wall portion is at an acute angle with respect to said major top surface and so that the cut portion of the fish head, which follows the gill opening, can engage firmly with said step as the fish head is pushed against said wall portion thereby to stabilize the fish during removal of the second fillet.

13. The filleting board of claim 12 wherein said elongated body includes opposing ends with said recess extending from one of said ends toward an intermediate portion of the body.

14. The filleting board of claim 13 wherein said step extends in a smoothly curved path from said one of the ends of the body toward said intermediate portion, and there curving smoothly around as seen in top plan view and proceeding in the opposite direction generally toward said one end for a selected distance.

15. The filleting board of claim 14 wherein said undercut wall portion is located in said intermediate portion of the body where said curved path curves smoothly around and begins to proceed in the opposite direction.

16. The filleting board of claim 12 wherein the floor of said recess has a shallow concavity defined therein closely adjacent said undercut wall portion, which concavity slopes shallowly downwardly generally toward said undercut wall portion thereby to assist in providing support for a range of sizes of fish heads.

17. The filleting board of claim 12, wherein said major top surface is essentially flat.

18. The filleting board of claim 15 wherein said major top surface is essentially flat.

19. The filleting board of claim 13 wherein said board is arranged so that, in its operational position, the top surface of the board slopes downwardly from the horizontal by an angle of 4 to about 12 degrees in a direction transverse to the longitudinal axis of the board.

* * * * *